Feb. 15, 1955 G. A. HEAD ET AL 2,702,186
ACCELEROMETER
Filed July 7, 1947
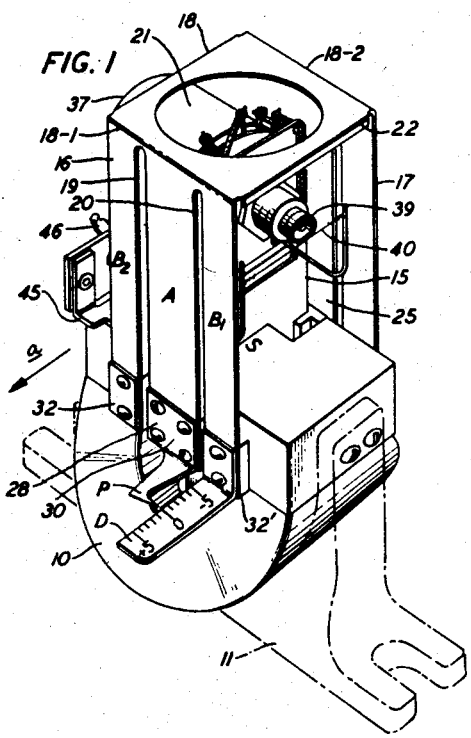
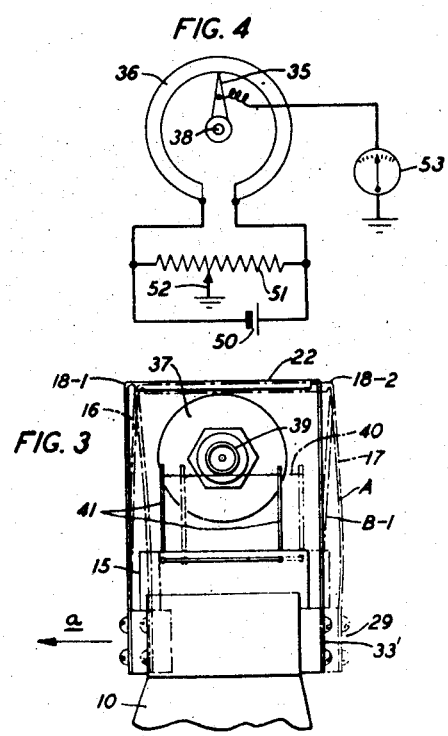
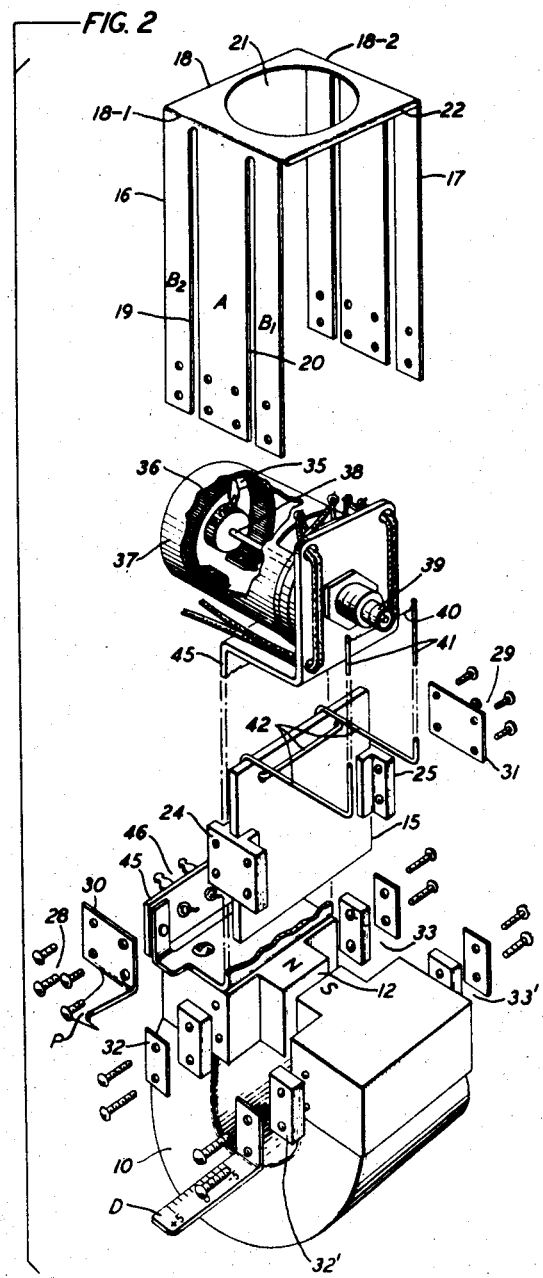
INVENTORS: G. A. HEAD
E. L. NORTON
BY
D. MacKenzie
AGENT

United States Patent Office 2,702,186
Patented Feb. 15, 1955

2,702,186

ACCELEROMETER

George A. Head and Edward L. Norton, Summit, N. J., assignors to Bell Telephone Laboratories, Incorporated, New York, N. Y., a corporation of New York Application July 7, 1947, Serial No. 759,452

5 Claims. (Cl. 264—1)

This invention relates to an improved accelerometer adapted especially to the measurement of constant or slowly varying accelerations, as of a body falling under gravity.

The general object of the invention is to provide an accelerometer for measuring accelerations which are steady or vary slowly with time.

A feature of the invention in one embodiment thereof is the inclusion of a circular potentiometer on which a brush is rotated proportionately to the rectilinear displacement of an acceleration responsive element from a rest position. This displacement is opposed by a resilient linkage between the responsive element and a fixed element, of such design that the relative motion of those elements is wholly rectilinear. To provide such a linkage is another object of the invention, as is also the provision of means for converting the straight line motion of the responsive element into rotary motion of the potentiometer brush. The purpose of this linkage is to render the accelerometer sensitive to acceleration in one direction alone.

The circular potentiometer shunts a source of constant voltage, and the voltage between the brush and the electrical midpoint of the potentiometer is proportional to the angle of rotation of the brush from the radius of that mid-point. Calculations or experiments permit the calibration of a meter reading the brush voltage in terms of acceleration, either directly in suitable units, for example, cm./sec.$^2$, or as multiples or fractions of gravity.

Instead of providing an electrical circuit to show the displacement of the responsive element as a voltage, one may use optical means of any known kind to record this displacement as the motion of a pointer over a graduated scale, either of which may be carried by the responsive element while the other is mounted on the fixed element.

Another object of the invention is therefore to provide means for measuring an acceleration as an electrical quantity of magnitude proportional to the acceleration and of sign depending on the sense thereof.

A further object of the invention is to provide in an accelerometer the union of compactness and small weight with high sensitivity.

The invention itself will be understood from the following description of a preferred embodiment thereof, read with reference to the accompanying drawing, in which:

Fig. 1 is a perspective view of the assembled accelerometer;

Fig. 2 is an exploded view of the instrument shown in Fig. 1;

Fig. 3 is a front elevation of the accelerometer showing its response to an acceleration directed toward the left, and Fig. 4 is a diagram of an electrical circuit suitable for measuring the response of the instrument.

In all figures, like numerals and letters designate like parts.

Referring to Figs. 1 and 2, numeral 10 designates a permanent magnet, suitably of "Alnico V," in the general form of a C, supported in any convenient way by the structure 11 of which the acceleration is to be measured. The faces of poles N, S of magnet 10 are separated by an air-gap 12 within which copper block 15 moves at right angles to the magnetic lines of force when structure 11 experiences an acceleration. Block 15, the acceleration responsive element, is a square flat sheet of thickness slightly less than the width of gap 12. Under an acceleration of structure 11 in the direction $a$ parallel to the faces of poles N, S, block 15 moves relatively to magnet 10 in a direction opposite to $a$. This relative motion is opposed by springs 16, 17 and is damped by eddy currents generated in the copper mass as it cuts the lines of force.

Springs 16 and 17 are formed as wings bent from a thin Phosphor bronze sheet 18 at lines 18–1, 18–2. Inasmuch as the springs are identical, only spring 16 will be particularly described. As shown in the drawing, Fig. 2, spring 16 is divided into three legs by slots 19 and 20 which extend from the end of this wing of sheet 18 nearly to the line at which the wing is bent. Center leg A is made twice the width of each outer leg $B_1$ or $B_2$, wherefore the bending stiffness of leg A is equal to the combined stiffness of legs $B_1$ and $B_2$. Spring 17 is identically like spring 16. For the sake of lightness, the portion of sheet 18 between the lines at which the wings are formed is pierced by aperture 21, which serves also to make accessible the potentiometer presently to be described. To give stiffness to this weakened central portion of sheet 18, originally wider than the combined width of the spring legs and slots, the overhanging width is, on each side at right angles to the planes of the springs, bent down into a lip 22.

The springs 16 and 17 are affixed as follows to magnet 10 and to block 15: Brass mooring plates 24 and 25 are suitably fastened by screws 28, 29, through brass plates 30, 31 on opposite sides (vertical in the figures) of block 15. On magnet 10 are provided similar moorings generally indicated as 32, 32', 33, 33' for the outer legs $B_1$ and $B_2$ of springs 16 and 17, in such fashion that the ends of all three legs of each spring are clamped in a line at right angles to their length and to the opposing faces of poles N, S.

The operation of this spring suspension is evident from Fig. 3. Here block 15 is shown displaced to the right in response to an acceleration of magnet 10 in the direction of the arrow $a$. It will be obvious that, inasmuch as the length is the same for all the legs of springs 16 and 17 and the stiffness of leg A equals the combined stiffness of legs $B_1$ and $B_2$, the motion of block 15 is wholly in a straight line without rise or descent. The lines 18–1 and 18–2 at which the legs are bent down from the original Phosphor bronze sheet, move in the same direction but half as much as does block 15; lip 22 moves parallel to its original level but descends slightly therefrom. It will be noted that the deformation of leg A is the mirror image of that of legs $B_1$ and $B_2$, for which reason the whole resilient linkage connecting block 15 and magnet 10 will herein be termed a "conjugate leaf spring suspension." Except for convenience in manufacture, springs 16 and 17 could be connected at their upper ends by any suitable member.

As a result of the strictly rectilinear motion of mass 15 due to this type of spring suspension, the accelerometer is sensitive to acceleration in only one coordinate and is not subject to "cross-talk" from accelerations in the coordinates at right angles thereto.

The relative deflection of block 15 may be indicated by the motion of pointer P carried by block 15, over scale D, fixed on magnet 10. Block 15 may suitably be of aluminum instead of copper. When it is not required to represent the deflection by a voltage as next described, and the indication by pointer P is sufficient, the entire electrical system later explained may be omitted.

The rectilinear motion of block 15 is utilized to rotate brush 35 on circular potentiometer 36, shown in Fig. 2, where casing 37 is partly broken away. Brush 35 is carried with suitable insulation on shaft 38 which continues through casing 37 to end in pulley 39. Referring particularly to Fig. 2, there is found enwrapping pulley 39 a nylon thread 40 stretched between the arms of a stiff yoke 41 formed of a Phosphor bronze wire 42 threaded, as indicated in the figure, through holes in block 15 and suitably bent to form yoke 41, the arms of which lie in a plane parallel to block 15 and extend upward at right angles to the permitted motion thereof. It is clear that sidewise displacement of block 15, such as indicated in Fig. 3, entrains yoke 41 and with it through thread 40 proportionally rotates pulley 39. As shown principally in Fig. 2 but indicated also in Fig. 1 potentiometer 36 may be supported by bracket 45 mounted in any convenient fashion on the upper surface of magnet 10 (a surface at right angles to the face of pole N) which positions the axis of the potentiometer at right angles both to block 15 and parallel to the planes of springs 16, 17.

The necessary electrical connections to the winding of potentiometer 36 and to brush 35 are made by soldered connections at external binding posts indicated generally by numeral 46 in Figs. 1 and 2. These connections are better explained in reference to Fig. 4, where an electrical circuit is schematically shown.

Fig. 4 shows a diagram of a current supply circuit for potentiometer 36 which avoids the use of an actual grounded midpoint connection to the potentiometer winding itself. Battery 50 is shunted by potentiometer 36 and also by a high resistance auxiliary potentiometer 51 on which a grounded tap 52 may be manually adjusted. Meter 53 is connected between ground and brush 35. In assembly, brush 35 is positioned on the physical mid-radius of potentiometer 36 when block 15 is in its undisturbed position, and by adjustment of tap 52 the point of the winding on this radius of potentiometer 36 is made the electrical mid-point and caused to stand at ground potential. This adjustment is made by setting tap 52 at such a point on potentiometer 51 that meter 53 reads zero voltage between brush 35 and ground. Thereafter, displacement in either direction of block 15 from its neutral position produces rotation of shaft 38 and brush 35 rotates through an angle proportional to the rectilinear motion of block 15.

Where several accelerometers of the type described are to be used in parallel from the same voltage source such as battery 50, obviously potentiometer 51 is to be omitted and a physical grounding of the mid-point of potentiometer 36 is required. It will be understood that the showing of Fig. 4 is illustrative only; numerous other circuits for the same purpose being permissible. Meter 53 may, of course, be replaced by a direct current amplifier and meter of conventional design.

Potentiometer 36, with its case and fittings is suitably an "Autoflight Microtorque Potentiometer" manufactured by G. M. Giannini Company, Pasadena, California.

An actual embodiment of the invention weighed 21 ounces complete except for battery and meter. In this particular instrument, designed to measure accelerations up to 7.5 times that of gravity, the dimensions were (refer to Fig. 3) 3.75 inches vertically by 2.25 inches normal to the plane of the figure and 1.63 inches in the direction of motion of block 15. Potentiometer 36 was of 2,000 ohms resistance with a carrying capacity of 2 watts; these data limit the voltage of battery 50 to some 60 volts.

The conjugate leaf spring suspension was stamped from a sheet of Phosphor bronze about 0.3 millimeter thick. The effective mass of the moving parts (copper block, springs, yoke and participating elements in the potentiometer) was 50 grams; the stiffness of the spring suspension $5 \times 10^5$ dynes/cm. Consequently, the resonant frequency of the block and suspension was $$\frac{100}{2\pi} \text{ cycles per second.}$$

Overshoot and unwanted oscillations are avoided by eddy currents generated in the copper block as it cuts the lines of magnetic force. The pole faces of the magnet were 2 square cm. in area, the air-gap 0.28 centimeter wide. For the resonant frequency ($f_0 = 16$ about), the displacement of block 15 required to measure an acceleration of 7.5 times gravity is $$X = \frac{7.5 \times 980}{(2\pi f_0)^2} = 0.735 \text{ cm.}$$

The required radius of pulley 39 is equal to this displacement divided by the desired angle of brush rotation either side of the neutral radius. In the "autoflight" potentiometer chosen for this purpose the electrical linearity of the winding is satisfactory throughout the 270 degrees of brush rotation available. Accordingly, for $X = 0.735$ cm. to rotate the brush 135 degrees ($\theta$) either side of the center, the radius $r$ of pulley 39 is given by the equation $$r = \frac{X}{\theta} = \frac{.735}{.75\pi} = 0.312 \text{ cm.}$$

The choice of resonant frequency is determined by consideration of the requirements of the apparatus (not a part of the invention) with which the accelerometer cooperates; for a particular system this consideration lead to the choice of $f_0$ as 16 cycles per second. This resonant frequency once chosen $$(2\pi f_0)^2 = \frac{S}{m}$$

where S is the stiffness of the suspension and $m$ is the effective mass of the moving parts. The force F on the mass $m$ corresponding to an acceleration $\alpha$ is $F = m\alpha$; the displacement X under this force is $$X = \frac{F}{S}$$

wherefore $$X = \frac{\alpha}{(2\pi f_0)^2}$$

The mass $m$ is chosen large enough for the torque $T = m\alpha r$ on pulley 39 to be greater than enough to overcome static friction of the potentiometer for the least acceleration to be measured. For the type of potentiometer selected, $m$ is appropriately 50 grams. This determines the stiffness leading to the value above stated for the spring suspension, which is then designed in accordance with well-known principles. At the same time the 50 gram mass (most of which is the copper block 15, 3.5 cm. square by 0.2 cm. thick) is small enough to permit adequate damping by eddy currents.

It is known to the art to design accelerometers on the principle of measuring the force required to check the excursion of an inertia element displaced relatively to a body undergoing acceleration. So far as known to us, however, no accelerometer of the prior art has taken advantage of the increased sensitivity consequent on the conversion of the straight line motion of the inertia element into motion of rotation as is done in the present invention through yoke 41, thread 40 and pulley 39. Thereby with multiplied sensitivity, the rotation of brush 35 measures the deflection of springs 16, 17 and therewith the force acting on the inertia element 15 relative to the fixed element 10. Parallel motion spring suspensions are known but we are not aware of any such as herein termed a "conjugate leaf spring suspension" where a U-shaped spring, the arms of which are each subdivided into E's as shown, so links the fixed and the inertia elements that the relative motion thereof is exclusively in one straight line.

What is claimed is:

1. An accelerometer including a magnet having opposite poles separated by an air-gap, a non-magnetic metallic mass, a connection between the magnet and the mass whereby the mass is supported in the air-gap movably relative to the magnet, the connection comprising a resilient member formed into a pair of E springs connected in spaced parallel relationship and individually secured at their ends to the magnet by the outer legs and to the mass by the central legs of the E's, and means for indicating the relative motion of the mass.

2. In an accelerometer, the combination of a magnet having opposite poles separated by an air-gap, a non-magnetic metallic mass, and a resilient connection between the magnet and the mass whereby the mass is movably supported in the air-gap, said connection comprising a resilient member formed into a pair of E springs connected in spaced parallel relationship and individually secured at their ends to the magnet by the outer legs of the E's and to the mass by the central legs of the E's, a circular potentiometer supported from the magnet and traversed by a brush carried on a shaft supported coaxially with the potentiometer, the shaft being perpendicular to the motion of the mass and terminating at one end in a pulley, a yoke carried by the mass and provided with arms lying in a plane perpendicular to the shaft, and a cord interconnecting the arms and enwrapping the pulley.

3. An accelerometer comprising a first element adapted to be secured to a body of which the acceleration is to be measured, a second element adapted to move relatively to the first element responsively to the acceleration, a resilient third element connecting the first and second elements and opposing the relative motion thereof, said third element consisting of a conjugate leaf spring suspension comprising a pair of E springs of each of which the three legs are of equal length, the outer legs are affixed at their ends to one of the first and second elements and the central leg is affixed to the other of the first and second elements, the two springs being thus affixed in spaced parallel planes at right angles to the direction of relative motion of the second element and being connected remotely from the ends of the legs by a stiff member in a plane perpendicular to the parallel planes and to the planes of the E's, and means for indicating the relative motion of the first and second elements.

4. An accelerometer as in claim 3, in which the outer legs of each E spring have together the same bending stiffness as the central leg thereof.

5. An accelerometer comprising a first element adapted to be secured to a body of which the acceleration is to be measured, a second element adapted to move relatively to the first element responsively to the acceleration, a connection between the said first and said second elements comprising a resilient member formed into a pair of E springs connected in spaced parallel relationship and individually secured at their ends to the said first element by the outer legs and to said second element by the central legs of the E's, and means for indicating the relative motion of said second element.

References Cited in the file of this patent

UNITED STATES PATENTS

| Number | Name | Date |
|---|---|---|
| 982,336 | Wimperis | Jan. 24, 1911 |
| 1,840,001 | Tsujita | Jan. 5, 1932 |
| 2,193,910 | Wilson | Mar. 19, 1940 |
| 2,210,970 | Bonell | Aug. 13, 1940 |
| 2,317,028 | Chappell | Apr. 20, 1943 |

OTHER REFERENCES

"The Measurement of Riding Qualities," in SAE Journal, June 1928, pages 636 and 637.